United States Patent
Komiya et al.

(10) Patent No.: US 9,394,398 B2
(45) Date of Patent: Jul. 19, 2016

(54) PHOSPHORUS-CONTAINING FLAME RETARDANT EPOXY RESIN

(71) Applicant: SANKO CO., LTD., Kurume-shi, Fukuoka (JP)

(72) Inventors: Naoki Komiya, Ibaraki (JP); Akira Inoue, Tokyo (JP)

(73) Assignee: SANKO CO., LTD., Kurume (JP)

( * ) Notice: Subject to any disclaimer, the term of this patent is extended or adjusted under 35 U.S.C. 154(b) by 0 days.

(21) Appl. No.: 14/683,001

(22) Filed: Apr. 9, 2015

(65) Prior Publication Data
US 2015/0307648 A1    Oct. 29, 2015

(30) Foreign Application Priority Data

Apr. 23, 2014    (JP) ................................. 2014-089503

(51) Int. Cl.
*C08G 59/14*    (2006.01)

(52) U.S. Cl.
CPC .................................. *C08G 59/1488* (2013.01)

(58) Field of Classification Search
None
See application file for complete search history.

(56) References Cited

U.S. PATENT DOCUMENTS

| | | | | |
|---|---|---|---|---|
| 2007/0060673 A1* | 3/2007 | Tobisawa | .................. | B32B 5/26 523/451 |
| 2014/0045973 A1* | 2/2014 | Bharadwaj | .............. | C08L 63/00 523/400 |
| 2014/0154939 A1* | 6/2014 | Rong | ..................... | C08G 59/34 442/59 |

FOREIGN PATENT DOCUMENTS

| EP | 741135 A2 * | 11/1996 | ........... C07D 303/16 |
|---|---|---|---|
| JP | 04-011662 | 1/1992 | |
| JP | 11-124489 | 5/1999 | |
| JP | 2012-177777 A * | 9/2012 | |
| JP | 2015-3875 A * | 1/2015 | |

* cited by examiner

*Primary Examiner* — Robert Sellers
(74) *Attorney, Agent, or Firm* — Maschoff Brennan

(57) ABSTRACT

The present invention provides a phosphorus-containing flame retardant epoxy resin that can constitute parts of electric or electronic equipment having low water absorptiveness and high heat resistance. The phosphorus-containing flame retardant epoxy resin is obtained by reacting an epoxy resin having at least three epoxy groups per molecule with an organophosphorus compound represented by Formula (I).

3 Claims, No Drawings

PHOSPHORUS-CONTAINING FLAME RETARDANT EPOXY RESIN

CROSS REFERENCE TO RELATED APPLICATION

This application claims the benefit of Japanese Patent Application No. JP 2014-089503, filed Apr. 23, 2014, which is hereby incorporated by reference in its entirety into this application.

BACKGROUND OF THE INVENTION

1. Technical Field

The present invention relates to a phosphorus-containing flame retardant epoxy resin.

2. Description of the Related Art

A reaction of an epoxy resin with a curing agent gives a three-dimensional cross-linked structure via molecular connection, ultimately obtaining a cured product having high mechanical strength and chemical resistance. The cured product of epoxy resin may be widely controlled in properties including toughness, heat resistance, water resistance, chemical resistance, weather resistance, etc., depending on the kind of curing agent. The epoxy resin having these excellent properties has been variously utilized in the field of parts of electric and electronic equipment, including semiconductor sealants, various laminates, printed circuit boards and so on. However, the epoxy resin is flammable and is thus mainly used together with a flame retardant in order to ensure combustion and fire safety.

Thus, a halogen compound containing a halogen atom in a molecule thereof (a halogen-based flame retardant) has been used to date, but is problematic because of generation of dioxin upon combustion. In order to cope with environmental concerns, a phosphorus compound containing a phosphorus atom instead of the halogen atom in a molecule thereof is being utilized these days as the flame retardant.

As the flame retardant, the phosphorus compound is known to be an additive phosphorus compound that does not react with an epoxy resin and a reactive phosphorus compound that reacts with an epoxy resin.

Examples of the additive phosphorus compound may include triphenylphosphate, tricresylphosphate, trixylenylphosphate, etc. However, since the additive phosphorus compound does not react with an epoxy resin even when added to the epoxy resin, a molded product obtained by curing the epoxy resin has problems of lowering glass-transition temperature (Tg) or deteriorating solder dip resistance after moisture absorption (see Patent Document 1).

On the other hand, an example of the reactive phosphorus compound may include 9,10-dihydro-9-oxa-10-phosphaphenanthrene-10-oxide represented by the following formula, which is abbreviated to ⌈DOPO⌋, commercially available as the trade name ⌈FICA⌋ (hereinafter, DOPO is referred to as ⌈FICA⌋) (see Patent Document 2). The use of HCA is shown to solve the problem of lowering Tg of the additive phosphorus compound, and to attain high flame retardancy.

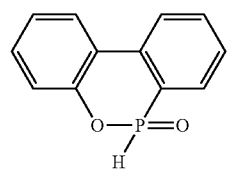 [SMILES: O=[PH]1Oc2ccccc2-c2ccccc21]

CITATION LIST

Patent Literature (Patent Document 1) Japanese Patent Application Publication No. 1992-11662

(Patent Document 2) Japanese Patent Application Publication No. 1999-124489

SUMMARY OF THE INVENTION

However, the epoxy resin reacted with HCA is problematic in terms of high water absorptiveness. This is considered to be because the epoxy resin reacted with HCA contains a phosphorus atom in the structure thereof, thus facilitating the absorption of water (high water absorptiveness).

Recently, parts of electric and electronic equipment are required to possess higher heat resistance and lower water absorptiveness due to high fineness thereof. In particular, in printed circuit boards using the epoxy resin reacted with HCA, expansion of a substrate and poor soldering in a soldering process exposed to high temperature may be caused by high water absorptiveness.

Therefore, the present invention has been made keeping in mind the above circumstances, and an object of the present invention is to provide a phosphorus-containing flame retardant epoxy resin that can constitute parts of electric or electronic equipment having low water absorptiveness and high heat resistance.

In order to accomplish the above object, the present invention provides a phosphorus-containing flame retardant epoxy resin, obtained by reacting an epoxy resin having at least three epoxy groups per molecule with an organophosphorus compound represented by Formula (I) below.

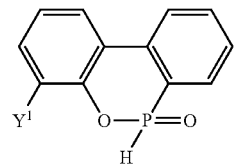

Formula (I)

(wherein $Y^1$ is an aralkyl group or an aryl group.)

In the phosphorus-containing flame retardant epoxy resin according to the present invention, it is good that the organophosphorus compound represented by Formula (I) is an organophosphorus compound represented by Formula (I)-101 or (I)-201 below.

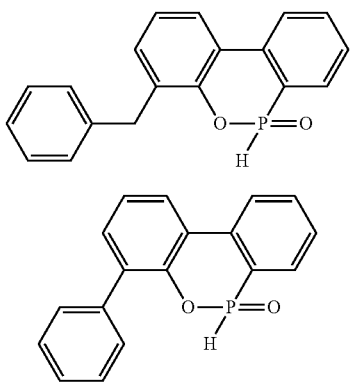

Formula (I)-101

Formula (I)-201

It is good that the phosphorus-containing flame retardant epoxy resin according to the present invention is obtained by mixing and reacting 100 parts by mass of the epoxy resin with 1~100 parts by mass of the organophosphorus compound represented by Formula (I).

According to the present invention, it provides a phosphorus-containing flame retardant epoxy resin that can constitute parts of electric or electronic equipment having low water absorptiveness and high heat resistance.

DESCRIPTION OF THE SPECIFIC EMBODIMENTS

Phosphorus-Containing Flame Retardant Epoxy Resin

According to the present invention, a phosphorus-containing flame retardant epoxy resin is obtained by reacting an epoxy resin having at least three epoxy groups per molecule (hereinafter, which is simply abbreviated to ⌈epoxy resin⌋) with an organophosphorus compound represented by the following Formula (I) (hereinafter, which is abbreviated to ⌈Compound (I)⌋).

The phosphorus-containing flame retardant epoxy resin has a structure derived from Compound (I), and thereby exhibits excellent properties of low water absorptiveness and high flame retardancy.

As used herein, ⌈epoxy resin⌋ refers not to ⌈phosphorus-containing flame retardant epoxy resin⌋ but to ⌈epoxy resin having at least three epoxy groups per molecule⌋ used to prepare the phosphorus-containing flame retardant epoxy resin, unless otherwise stated.

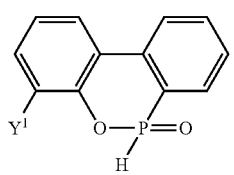

Formula (I)

(wherein $Y^1$ is an aralkyl group or an aryl group.)

(Epoxy Resin)

The epoxy resin is not particularly limited so long as it has at least three epoxy groups per molecule, and preferred examples thereof include phenol novolac epoxy resin, cresol novolac epoxy resin, triglycidyl p-aminophenol, tetraglycidyl diaminodiphenylmethane, triglycidyl isocyanurate, tetrakis(glycidyloxyphenyl)ethane, etc.

The epoxy resin may be used alone or in a combination of two or more. When the epoxy resin is used in a combination of two or more, the composition and the ratio thereof may be arbitrarily adjusted.

Upon reaction of Compound (I) with the epoxy resin, 1 mol of Compound (I) typically reacts with 1 mol of the epoxy group. Hence, when the epoxy resin having at least three epoxy groups per molecule is used, Compound (I) is stably introduced into an epoxy resin backbone, and also epoxy resin molecules are connected to each other, thus suppressing a reduction in the cross-linking density of the resulting phosphorus-containing flame retardant epoxy resin. Consequently, the phosphorus-containing flame retardant epoxy resin may achieve high flame retardancy even in the absence of a halogen compound, and also possesses high heat resistance and low water absorptiveness.

In the present invention, the phosphorus-containing flame retardant epoxy resin may include not only the reaction product of one molecule of Compound (I) relative to one molecule of the epoxy resin, but also the reaction product of at least two molecules of Compound (I) relative to one molecule of the epoxy resin.

Preferably useful as the epoxy resin is a phenol novolac resin or a cresol novolac resin because the cross-linking density is not reduced and Compound (I) is more stably introduced into the epoxy resin backbone.

(Compound (I))

Compound (I) is an organophosphorus compound represented by Formula (I), especially a reactive organophosphorus compound that reacts with the epoxy resin.

Compound (I) has low water absorptiveness, and may be easily introduced into the epoxy resin backbone by the reaction with the epoxy group.

In Formula (I), $Y^1$ is an aralkyl group or an aryl group.

The aryl group of $Y^1$ may be either monocyclic or polycyclic.

The aryl group preferably has 6 to 12 carbon number, and may be exemplified by phenyl, 1-naphthyl, 2-naphthyl, o-tolyl, m-tolyl, p-tolyl, xylyl (a dimethylphenyl group), etc. Also, examples of the aryl group may include those where at least one hydrogen atom thereof is substituted with a linear, branched or cyclic alkyl group, or aryl group. As such, the linear, branched or cyclic alkyl group that substitutes for the hydrogen atom may be exemplified by those in the description of an alkylene group that will be described later, and the aryl group may include those listed as above.

The aryl group is preferably a phenyl group.

When the aralkyl group of $Y^1$ is regarded as a monovalent group where an aryl group is linked with an alkylene group, the aryl group may be either monocyclic or polycyclic, and may be exemplified by the same as the aryl group of $Y^1$. The alkylene group may be linear, branched, or cyclic. The cyclic alkylene group may be either monocyclic or polycyclic, and may include a combination of a chain structure and a cyclic structure. The alkylene group is preferably linear or branched.

Examples of the alkylene group may include divalent groups formed by excluding a single hydrogen atom from: linear or branched alkyl groups having 1 to 10 carbon number, such as methyl, ethyl, n-propyl, isopropyl, n-butyl, isobutyl, sec-butyl, tert-butyl, n-pentyl, isopentyl, neopentyl, tert-pentyl, 1-methylbutyl, n-hexyl, 2-methylpentyl, 3-methylpentyl, 2,2-dimethylbutyl, 2,3-dimethylbutyl, n-heptyl, 2-methylhexyl, 3-methylhexyl, 2,2-dimethylpentyl, 2,3-dimethylpentyl, 2,4-dimethylpentyl, 3,3-dimethylpentyl, 3-ethylpentyl, 2,2,3-trimethylbutyl, n-octyl, isooctyl, nonyl, decyl, etc.; cyclic alkyl groups having 3 to 10 carbon number, such as cyclopropyl, cyclobutyl, cyclopentyl, cyclohexyl, cycloheptyl, cyclooctyl, cyclononyl, cyclodecyl, norbornyl, isobornyl, 1-adamantyl, 2-adamantyl, tricyclodecyl, etc.; and alkyl groups where at least one hydrogen atom of the cyclic alkyl group is substituted with a linear, branched or cyclic alkyl group (examples of the linear, branched or cyclic alkyl group that substitutes for a hydrogen atom may include those listed as above).

The aralkyl group preferably has 7 to 20 carbon number, and examples thereof may include benzyl (a phenylmethyl group), o-methylbenzyl, m-methylbenzyl, p-methylbenzyl, phenethyl (a phenylethyl group), etc. Preferably useful is a benzyl group.

The reason why the phosphorus-containing flame retardant epoxy resin has low water absorptiveness is considered that it has a structure derived from Compound (I) and also that the aralkyl group or aryl group therein prevents water from approaching it and suppresses the permeation of water into the structure derived from Compound (I).

The reason why the phosphorus-containing flame retardant epoxy resin has high flame retardancy is considered that it has a structure derived from Compound (I).

When $Y^1$ is an aralkyl group, it is assumed that the aralkyl group is cleaved upon combustion to generate a radical species, which may supplement another radical species produced by a radical chain reaction upon combustion, thus inhibiting a combustion reaction, resulting in high flame retardancy. For example, Japanese Patent Application Publication No. 2001-19835 discloses compounds that have improved heat resistance via cross-linking of a radical species generated by heating with a polyester resin.

On the other hand, when $Y^1$ is an aryl group, a benzene ring backbone is linked to an adjacent group via single bonding, thus increasing the residual product upon combustion to thereby block oxygen necessary for combustion, resulting in high flame retardancy.

Compound (I) is preferably an organophosphorus compound represented by the following Formula (I)-101 (8-benzyl-9,10-dihydro-9-oxa-10-phosphaphenanthrene-10-oxide, which is hereinafter abbreviated to ⌈Compound (I)-101⌋), or an organophosphorus compound represented by the following Formula (I)-201 (8-phenyl-9,10-dihydro-9-oxa-10-phosphaphenanthrene-10-oxide, which is hereinafter abbreviated to ⌈Compound (I)-201⌋), having lower water absorptiveness and higher flame retardancy. The reason why Compound (I)-101 has superior flame retardancy is considered that a component produced by combustion blocks oxygen together with phosphorus (P) to further enhance flame retardancy.

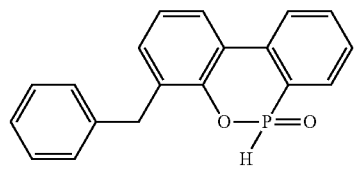

Formula (I)-101

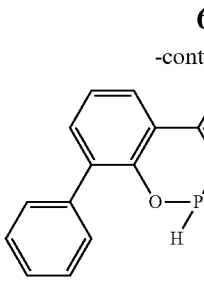

Formula (I)-201

Compound (I)-101 may include, for example, ⌈Bz-HCA⌋ available from Sanko, and Compound (I)-201 may be exemplified by ⌈Ph-HCA⌋ available from Sanko.

Compound (I) may be used alone or in a combination of two or more. When Compound (I) is used in a combination of two or more, the composition and the ratio thereof may be arbitrarily adjusted.

Compound (I) may be prepared by a known method. For example, Compound
(I) other than Compound (I)-101 and Compound (I)-201 may be synthesized in the same manner as in the preparation method of commercially available Compound (I)-101 or Compound (I)-201, with the exception that the kind of $Y^1$ of the reactant used is different.

In the present invention, Compound (I) is used as a reactive organophosphorus compound. As such, the reactive organophosphorus compound where $Y^1$ of Compound (I) is a hydrogen atom and at least one of seven hydrogen atoms of the benzene ring backbone is substituted with an aralkyl group or an aryl group is considered to exhibit the same effects as in Compound (I).

The phosphorus-containing flame retardant epoxy resin is obtained by reacting the epoxy resin and Compound (I).

The mixing ratio of reactant compounds to be reacted is not particularly limited, but Compound (I) is used in an amount of 1~100 parts by mass, preferably 2~85 parts by mass, and more preferably 3~75 parts by mass, based on 100 parts by mass of the epoxy resin. When the amount of Compound (I) is equal to or more than the lower limit, the amount of Compound (I) that reacts with the epoxy resin may increase, thus further enhancing flame retardancy of the phosphorus-containing flame retardant epoxy resin. On the other hand, when the amount of Compound (I) is equal to or less than the upper limit, an over-reaction between Compound (I) and the epoxy resin is inhibited, and thus the remaining amount of the unreacted epoxy group is appropriately increased, thereby further raising the cross-linking density of the phosphorus-containing flame retardant epoxy resin.

The reaction between the epoxy resin and Compound (I) is preferably carried out using a catalyst such as triphenylphosphine, etc.

Although the amount of the catalyst is not particularly limited, it is preferably set to 0.01~1 mass %, and more preferably 0.02~0.5 mass %, based on the total amount of the epoxy resin and Compound (I).

Although the conditions when reacting the epoxy resin with Compound (I) are not particularly limited, the reaction temperature is preferably 130~230° C., and more preferably 150~200° C. The reaction time is properly controlled in view of the reaction temperature, and is preferably 3~20 hr, and more preferably 5~12 hr.

The reaction product of the epoxy resin and Compound (I) may be used unchanged as the phosphorus-containing flame retardant epoxy resin, or alternatively may be subjected to known post-treatment, so that the resulting product may be used as the phosphorus-containing flame retardant epoxy resin.

The phosphorus content of the phosphorus-containing flame retardant epoxy resin is preferably 1~10 mass %, and more preferably 2~6 mass %. Given the above phosphorus content range, a phosphorus-containing flame retardant epoxy resin having superior flame retardancy and profitability may be more easily prepared.

As used herein, ⌈phosphorus content of phosphorus-containing flame retardant epoxy resin⌋ indicates a ratio of mass of phosphorus (P) of the phosphorus-containing flame retardant epoxy resin relative to the total mass of the phosphorus-containing flame retardant epoxy resin, and for instance, may be calculated by a method described in the following examples.

<Flame Retardant Epoxy Resin Composition>

In the present invention, a flame retardant epoxy resin composition contains the phosphorus-containing flame retardant epoxy resin as above, and is used as, for example, a compound or a varnish.

The flame retardant epoxy resin composition possesses low water absorptiveness and high flame retardancy by using the phosphorus-containing flame retardant epoxy resin as above.

The flame retardant epoxy resin composition may contain a component (hereinafter abbreviated to ⌈other component⌋) in addition to the phosphorus-containing flame retardant epoxy resin within a range that does not impair the effects of the present invention.

Based on the total solid content of the flame retardant epoxy resin composition, the amount of the phosphorus-containing flame retardant epoxy resin is preferably 20 mass % or more, and more preferably 30 mass % or more. The upper limit of the amount of the phosphorus-containing flame retardant epoxy resin is not particularly limited, but may be appropriately adjusted depending on needs, and may be set to 100 mass %. When the other component is used, such an upper limit is set to preferably 80 mass %, and more preferably 60 mass %.

The other component is preferably exemplified by a curing agent, a curing accelerator, an epoxy resin other than the phosphorus-containing flame retardant epoxy resin, a filler, an additive, and a solvent.

The other component may be used alone or in a combination of two or more. When the other component is used in a combination of two or more, the composition and the ratio thereof may be arbitrarily adjusted.

As the other component, a curing agent (an epoxy resin curing agent) is necessary for forming a cured product, a film, a prepreg, a metal-clad laminate, a printed circuit board, etc. by using the flame retardant epoxy resin composition.

The curing agent is not particularly limited so long as it is able to cure the epoxy resin, and examples thereof may include an amine, an acid anhydride, a Lewis acid type amine complex, an onium salt, an imidazole derivative, a novolac resin, phenols, etc.

Examples of the amine may include aromatic amines, such as diaminodiphenylmethane, diaminodiphenylsulfone, etc.; aliphatic amines; dicyandiamide; 1,1,3,3-tetramethylguanidine; thiourea added amine; and isomers and modified products of these compounds (aromatic amines~thiourea added amine), etc.

Examples of the acid anhydride may include phthalic anhydride, maleic anhydride, succinic anhydride, etc.

Examples of the Lewis acid type amine complex may include boron trifluoride ($BF_3$)-amine complex, zinc chloride ($ZnCl_2$)-amine complex, tin (IV) chloride ($SuCl_4$)-amine complex, iron (III) chloride ($FeCl_3$)-amine complex, aluminum chloride ($AlCl_3$)-amine complex, etc.

Examples of the onium salt may include diphenyliodonium hexafluorophosphate, triphenylsulfonium hexafluorophosphate, etc.

The imidazole derivative means that at least one hydrogen atom of imidazole is substituted with a group other than hydrogen atom, such as an alkyl group, etc. Examples of the imidazole derivative may include 2-methyl imidazole, 2-ethyl-4-methylimidazole, etc.

Examples of the novolac resin may include phenol novolac resin, cresol novolac resin, bisphenol A novolac resin, etc.

The phenols mean that at least one hydrogen atom of phenol is substituted with a group other than hydrogen atom. Examples of the phenols may include cresol, bisphenol A, etc.

For instance, when a prepreg is formed by using the flame retardant epoxy resin composition, the curing agent such as dicyandiamide, phenol novolac resin or cresol novolac resin is preferably used in terms of improving conservative property of the obtained prepreg.

The amount of the curing agent is set so that the ratio of equivalent of active hydrogen of the curing agent relative to the epoxy equivalent of components of the flame retardant epoxy resin composition excluding the curing agent is preferably 0.3~1.0, and more preferably 0.5~0.8. When the above ratio is equal to or more than the lower limit, curing of the phosphorus-containing flame retardant epoxy resin is further performed. On the other hand, when the above ratio is equal to or less than the upper limit, excessive use of the curing agent is suppressed.

As the other component, the curing accelerator is separately used from the curing agent, and is added to accelerate the curing reaction.

Examples of the curing accelerator may include an amine-based curing accelerator, a phosphorus-based curing accelerator, etc.

The amine-based curing accelerator may be exemplified by 2-methylimidazole, 2-ethyl-4-methylimidazole, etc.

The phosphorus-based curing accelerator may be exemplified by triphenylphosphine, tricyclohexylphosphine, etc.

The amount of the curing accelerator is preferably 0.01~3 mass % and more preferably 0.03~1 mass % based on the total solid content of the flame retardant epoxy resin composition.

As the other component, the epoxy resin other than the phosphorus-containing flame retardant epoxy resin (hereinafter abbreviated to ⌈other epoxy resin⌋), for example, may play a role in controlling the phosphorus concentration, viscosity, heat resistance, flame retardancy and UV absorptiveness of the flame retardant epoxy resin composition when the flame retardant epoxy resin composition is used as a master batch.

Examples of the other epoxy resin may include, but are not limited to, phenol novolac epoxy resin, cresol novolac epoxy resin, triglycidyl p-aminophenol, tetraglycidyl diaminodiphenylmethane, triglycidyl isocyanurate, tetrakis(glycidyloxyphenyl)ethane, bisphenol A-type epoxy resin, bisphenol F-type epoxy resin, biphenol-type epoxy resin, bisphenol fluorene-type epoxy resin, phenyl glycidylether, o-phenylphenol glycidylether, etc.

The other epoxy resin may be configured to have at least three epoxy groups per molecule or two or less (one or two) epoxy groups per molecule.

In the flame retardant epoxy resin composition, the amount of the other epoxy resin is not particularly limited. For example, in the flame retardant epoxy resin composition, the amount of the phosphorus-containing flame retardant epoxy resin is preferably 1 mass % or more, more preferably 5 mass % or more, and much more preferably 10 mass % or more, based on the total amount of the phosphorus-containing flame retardant epoxy resin and the other epoxy resin.

As the other component, the filler is used to enhance the Tg, flame retardancy or rigidity of the flame retardant epoxy resin composition.

The filler is preferably an inorganic filler, and examples of the inorganic filler may include silica powder; powder of metal hydrate such as aluminum hydroxide, magnesium hydroxide, etc.; and powder of clay mineral such as talc, clay, etc.

The amount of the filler is preferably 0~800 mass % based on the total amount of the flame retardant epoxy resin composition excluding the filler.

As the other component, the additive may be exemplified by a reaction aid, a flame retardant, a flame retarding aid, a leveling agent, a colorant, etc.

The amount of the additive of the flame retardant epoxy resin composition is appropriately adjusted depending on the kind of additive, and is not particularly limited.

As the other component, the solvent is necessary for forming the flame retardant epoxy resin composition into a varnish.

The solvent is preferably an organic solvent, which is exemplified by aromatic hydrocarbons such as benzene, toluene, etc.; amides such as N—N-dimethylformamide, N,N-dimethylacetamide, etc.; ketones such as acetone, methylethylketone, etc.; alcohols such as methanol, ethanol, etc.; and ethers such as dimethylether, diethylether, etc.

The amount of the solvent of the flame retardant epoxy resin composition is appropriately adjusted in consideration of desirable viscosity or the like, and is not particularly limited.

The phosphorus content of the flame retardant epoxy resin composition is preferably 0.1~8 mass %, and more preferably 0.3~3 mass %. When the phosphorus content of the flame retardant epoxy resin composition is equal to or more than the lower limit, flame retardancy is further improved. On the other hand, when the phosphorus content of the flame retardant epoxy resin composition is equal to or less than the upper limit, flame retardancy does not deteriorate and excessive use of Compound (I) or the phosphorus-containing flame retardant epoxy resin is suppressed, thus further increasing profitability. As used herein, ⌈phosphorus content of the flame retardant epoxy resin composition⌋ refers to a ratio of mass of phosphorus (P) of the flame retardant epoxy resin composition relative to the total mass of the flame retardant epoxy resin composition, and for example, may be calculated by a method described in the following examples.

The flame retardant epoxy resin composition is obtained by mixing the phosphorus-containing flame retardant epoxy resin and as necessary, the other component. The resulting mixture may be used unchanged as a flame retardant epoxy resin composition, and as necessary, may be subjected to known post-treatment, so that the resulting product may be used as the flame retardant epoxy resin composition.

The individual components may be mixed in such a manner that all components may be added and then mixed, some components may be mixed while being sequentially added, or all components may be mixed while being sequentially added.

The mixing process is not particularly limited, and is properly selected from among known processes using a ball mill, a bead mill, a mixer or a blender. The individual components may be uniformly dissolved or dispersed upon mixing.

The mixing temperature and the mixing time are not particularly limited so long as the mixing components are not degraded. Preferably, the mixing temperature is 15~30° C., and the mixing time is 0.5~24 hr.

<Cured Product>

A flame retardant cured product may be used by curing the flame retardant epoxy resin composition, and the cured product, for example, is useful as a member for the electric and electronic equipment, especially a sealant, etc.

The cured product results from heating the flame retardant epoxy resin composition. More specifically, for example, the flame retardant epoxy resin composition in a liquid phase is placed in a cup, cavity, or a package recess, using a dispensing process or the other processes, heated and thus cured. Alternatively, the flame retardant epoxy resin composition in a solid phase or a liquid phase having high viscosity may be heated and thus fluidized, and then placed in a cup, cavity, or a package recess as above, further heated and thus cured.

<Film>

A flame retardant film may be formed from the flame retardant epoxy resin composition.

The film, for example, is obtained by applying the above-mentioned flame retardant epoxy resin composition in varnish form on a support and then drying it.

The flame retardant epoxy resin composition may be applied using a known process, such as printing, coating, or dipping method.

The flame retardant epoxy resin composition may be dried by, for example, removing the solvent by heating. Heating may be conducted using air blowing, hot air spraying, etc.

The material for the support is not particularly limited, but may be exemplified by polyolefins, such as polystyrene, polypropylene, polyvinyl chloride, etc.; polyesters, such as polyethylene terephthalate, polyethylene naphthalate, etc.; polycarbonate; polyimide; paper; and metals, such as copper, aluminum, etc.

The coated surface of the support may be subjected to surface treatment, such as MAD (Modification by Accelerated Diffusion) treatment, corona treatment, release treatment, etc.

The thickness of the support is not particularly limited, but is preferably 10~150 μm. The support may be provided in the form of a film, and may be exemplified by a metal foil, such as a copper foil, an aluminum foil, etc., so long as it is made of a metal.

<Prepreg>

The flame retardant epoxy resin composition is suitable for manufacturing a flame retardant prepreg.

The prepreg, for example, is obtained by impregnating a fibrous substrate with the above-mentioned flame retardant epoxy resin composition in varnish form and then heating it.

The fibrous substrate is not particularly limited, and may be exemplified by woven or nonwoven fabric of inorganic fibers such as glass, etc., aramide fibers, polyester fibers, carbon fibers, paper, etc.

The thickness of the fibrous substrate is not particularly limited but may be 20~200 μm. The fibrous substrate preferably is provided in the form of a sheet.

Impregnation with the flame retardant epoxy resin composition may be conducted using a known process, such as dipping method, coating method, etc.

Impregnation with the flame retardant epoxy resin composition may be carried out once or may be performed two or more times. When this process is repeated two or more times, the same kind of flame retardant epoxy resin composition may be used, or a different kind of flame retardant epoxy resin composition may be applied to some or all of the repeated processes. As such, the different kind of flame retardant epoxy resin composition means that at least one of the kind and concentration of the components of the flame retardant epoxy resin composition is different. For instance, when impregnation is performed a plurality of times using a different kind of flame retardant epoxy resin compositions, the composition and amount of the obtained prepreg resin may be adjusted.

Heating the impregnated flame retardant epoxy resin composition includes drying it to remove the solvent and semi-curing the resin component (into a B-stage). As such, heating preferably is conducted, for example, at 100~180° C. for 3~15 min.

The prepreg may contain 20~90 mass % of a resin. As used herein, 「resin」 refers to any resin component including not only a phosphorus-containing flame retardant epoxy resin and a cured product thereof but also, for example, the other epoxy resin, etc.

<Metal-Clad Laminate>

The prepreg is very suitable for manufacturing a metal-clad laminate.

The metal-clad laminate may be obtained, for example, using a single prepreg or a prepreg stack comprising a plurality of prepregs stacked one's principal plane over another's principal plane, by the following method. Specifically, a metal foil such as a copper foil, etc. is placed on either or both of the upper and lower sides of a single prepreg or a prepreg stack, and the resulting stack may be heated and pressed so as to be shaped, and thus integrated. Accordingly, there is provided a single-sided metal foil-clad laminate obtained by forming a metal foil on either side (upper or lower side) of a single prepreg or a prepreg stack, or a double-sided metal foil-clad laminate obtained by forming a metal foil on both sides (upper and lower sides) of a single prepreg or a prepreg stack.

The shaping conditions are not particularly limited, and may be appropriately set depending on the thickness of the desired metal-clad laminate or the kind of resin of the prepreg. Preferably, heating is performed at 50~190° C., and pressing is conducted at 1~5000 kPa, and a period of time required to carry out heating and pressing is set to 5~180 min.

<Printed Circuit Board>

The metal-clad laminate is very suitable for manufacturing a printed circuit board.

The printed circuit board is obtained by, for example, etching the metal foil on the surface of the metal-clad laminate to form a circuit pattern. Also, the printed circuit board may be obtained by directly forming a circuit pattern via plating, etc. using a conductive material on the surface of the metal-clad laminate from which the metal foil was removed.

The cured product, the film, the prepreg, the metal-clad laminate, and the printed circuit board (hereinafter abbreviated to 「cured product or the like」) all use the flame retardant epoxy resin composition and thus possess high flame retardancy even in the absence of a halogen-based flame retardant. The portion of the cured product, film, prepreg, metal-clad laminate and printed circuit board, which is formed using the flame retardant epoxy resin composition, has low water absorptiveness and high heat resistance, with high Tg. Such a cured product or the like is suppressed in expansion of a substrate or poor soldering in a soldering process exposed to high temperature, thus preventing deterioration of quality, resulting in parts of electric and electronic equipment having good quality.

For example, the portion of the cured product, film, prepreg, metal-clad laminate or printed circuit board, which is formed using the flame retardant epoxy resin composition, may have a Tg of 140° C. or more.

Examples

A better understanding of the present invention can be obtained via the following specific examples that are set forth to illustrate, but are not to be construed as limiting the present invention.

Example 1

Preparation of Phosphorus-Containing Flame Retardant Epoxy Resin

In a 2000 mL four-neck flask, Compound (I)-101 (519.4 g, 1.70 mol), a phenol novolac epoxy resin (「YDPN-638」 made by Nippon Steel & Sumikin Chemical, epoxy equivalent 177 g/eq) (731.3 g), and a triphenylphosphine catalyst (0.52 g, 0.0020 mol) were placed, heated, dissolved, and reacted for 9 hr with stirring at 180° C. After termination of the reaction, the reaction product was poured and cooled in a metal tray, thus obtaining a phosphorus-containing flame retardant epoxy resin (C-1) (1213.6 g) in a glass phase. The epoxy equivalent of the obtained phosphorus-containing flame retardant epoxy resin (C-1) was 496 g/eq, and the phosphorus content thereof was 4.1% (theoretical phosphorus content: 4.2%) as shown in Table 1 below. The phosphorus content was measured according to JIS K 0102 46.3.1 and JIS K 0102 46.1.1.

<Preparation of Flame Retardant Epoxy Resin Composition>

As shown in Table 2 below, the phosphorus-containing flame retardant epoxy resin (C-1) (100 parts by mass) was added with an o-cresol novolac epoxy resin (40.7 parts by mass), a bisphenol A-type epoxy resin (26.8 parts by mass), tetrakis(glycidyloxyphenyl)ethane (10.1 parts by mass), dicyandiamide (made by Wako Pure Chemical Industries) (5.3 parts by mass) as a curing agent, 2-methylimidazole (made by Wako Pure Chemical Industries) (0.24 parts by mass) as a curing accelerator, and as fillers, silicon oxide (made by Guangdong Zhongshan Jiali Photoelectric Material) (35.3 parts by mass) and aluminum hydroxide (made by Jinan Jinyingtai Chemical) (44.1 parts by mass), and uniformly mixed at 25° C. for 60 min, giving a resin composition (a flame retardant epoxy resin composition). Also, in Table 2, 「-」 in the mixing component (parts by mass) indicates non-mixing of the corresponding component.

Subsequently, the total amount of the resin composition thus obtained was added with methylethylketone (76.1 parts by mass) and N,N-dimethylformamide (68.4 parts by mass) and mixed at 25° C. for 60 min using a mixer, giving a flame retardant epoxy resin composition in varnish form. The phosphorus content of the flame retardant epoxy resin composition in varnish form thus obtained was 2.5% (theoretical phosphorus content: 2.4%) as shown in Table 2 below. The phosphorus content was measured in the same manner as in the phosphorus-containing flame retardant epoxy resin.

<Preparation of Printed Circuit Board>

Dipped in the flame retardant epoxy resin composition in varnish form thus obtained was glass cloth (「7628 Fiberglass Fabric」 made by Jushi Group Jiujiang), so that the flame retardant epoxy resin composition in varnish form was impregnated in an amount of 20~90 mass % based on the total amount of the glass cloth, and then heated at 175° C. for 4 min to remove the solvent and to semi-cure the resin component, thereby producing a prepreg. The prepreg contained 66 mass % of the resin.

Subsequently, five prepregs thus obtained were stacked, and a copper foil (⌈Electrolytic Copper Foil⌋ made by Jiangtong Yezi Tongbo) having a thickness of 35 μm was placed on both sides (upper and lower sides) of the prepreg stack. The resulting stack was heated and pressed for a total processing time of 155 min under processing conditions of a temperature of 50~185° C. and a pressure of 1450~3900 kPa, and thereby the copper foil was adhered to the prepreg stack, giving a copper-clad laminate 1.0 mm thick.

Subsequently, the copper foil of the copper-clad laminate was etched, thus forming a circuit pattern, resulting in a printed circuit board.

<Evaluation of Printed Circuit Board>

The printed circuit board thus obtained was measured for glass-transition temperature (Tg), heat resistance, water absorptiveness, and flame retardancy by the following methods. The results are shown in Table 2 below.

(Glass-Transition Temperature (Tg))

The copper foil was removed from the surface of the copper-clad laminate, and the Tg of the resulting laminate was measured using ⌈DSC Q-20⌋ made by TA Instruments. Specifically, when the laminate was heated to 180° C. from room temperature at a heating rate of 20° C./min, a temperature showing an inflection point was determined to be Tg.

(Heat Resistance)

The copper foil was removed from the surface of the copper-clad laminate, after which the resulting laminate was heated to 288° C. from room temperature at a heating rate of 10° C./min using a thermomechanical analyzer (TMA) (⌈TMA-400 type⌋ made by TA Instrument-Waters LLC), and maintained at 288° C., and a period of time required to cause delamination was checked.

(Water Absorptiveness (Water Absorption Rate))

The copper foil was removed from the surface of the copper-clad laminate, after which the resulting laminate was cut to a test sample having a length of 50 mm and a width of 50 mm (hereinafter abbreviated to ⌈Test Sample (1)⌋). This Test Sample (1) was dipped in water for 24 hr under conditions of room temperature and normal pressure, after which water was wiped from the surface of Test Sample (1), and then the mass of Test Sample (1) after dipping was measured. Further, a percentage of a mass increment of Test Sample (1) by dipping treatment ({[mass of Test Sample (1) after dipping]–[mass of Test Sample (1) before dipping]}/[mass of Test Sample (1) before dipping]×100) was calculated, and determined to be a water absorption rate, thus evaluating water absorptiveness.

(Flame Retardancy)

The copper foil was removed from the surface of the copper-clad laminate, after which the resulting laminate was cut to a test sample having a length of 127 mm and a width of 12.7 mm (hereinafter abbreviated to ⌈Test Sample (2)⌋). This Test Sample (2) was subjected to combustion testing according to a combustion testing method of ⌈Test for Flammability of Plastic Materials UL94⌋ by Under writers Laboratories in order to evaluate flame retardancy.

Example 2

Preparation of Phosphorus-Containing Flame Retardant Epoxy Resin

In a 2000 mL four-neck flask, Compound (I)-101 (368.2 g, 1.21 mol), a phenol novolac epoxy resin (⌈YDPN-638⌋ made by Nippon Steel & Sumikin Chemical, epoxy equivalent 177 g/eq) (884.1 g), and a triphenylphosphine catalyst (0.37 g, 0.0014 mol) were added, heated, dissolved, and reacted for 7.5 hr with stirring at 180° C. After termination of the reaction, the reaction product was poured and cooled in a metal tray, thus obtaining a phosphorus-containing flame retardant epoxy resin (C-2) (1233.0 g) in a glass phase. The epoxy equivalent of the obtained phosphorus-containing flame retardant epoxy resin (C-2) was 327 g/eq, and the phosphorus content thereof measured in the same manner as in Example 1 was 3.0% (theoretical phosphorus content: 3.0%) as shown in Table 1 below.

<Preparation of Flame Retardant Epoxy Resin Composition>

The phosphorus-containing flame retardant epoxy resin (C-2) (100 parts by mass) was added with an o-cresol novolac epoxy resin (40.7 parts by mass), a bisphenol A-type epoxy resin (26.8 parts by mass), tetrakis(glycidyloxyphenyl)ethane (10.1 parts by mass), dicyandiamide (made by Wako Pure Chemical Industries) (4.7 parts by mass) as a curing agent, 2-methylimidazole (made by Wako Pure Chemical Industries) (0.44 parts by mass) as a curing accelerator, and as fillers, silicon oxide (made by Guangdong Zhongshan Jiali Photoelectric Material) (35.3 parts by mass) and aluminum hydroxide (made by Jinan Jinyingtai Chemical) (44.1 parts by mass), and uniformly mixed at 25° C. for 60 min, giving a resin composition (a flame retardant epoxy resin composition).

Subsequently, the total amount of the resin composition thus obtained was added with methylethylketone (76.1 parts by mass) and N,N-dimethylformamide (68.4 parts by mass) and mixed at 25° C. for 60 min using a mixer, giving a flame retardant epoxy resin composition in varnish form. The phosphorus content of the flame retardant epoxy resin composition in varnish form as measured in the same manner as in Example 1 was 1.8% (theoretical phosphorus content: 1.7%) as shown in Table 2 below.

<Preparation and Evaluation of Printed Circuit Board>

A printed circuit board was manufactured and evaluated in the same manner as in Example 1, with the exception that the flame retardant epoxy resin composition in varnish form as above was used. The results are shown in Table 2 below. The prepreg thus obtained contained 66 mass % of the resin.

Example 3

Preparation of Phosphorus-Containing Flame Retardant Epoxy Resin

In a 2000 mL four-neck flask, Compound (I)-201 (362.4 g, 1.24 mol), a phenol novolac epoxy resin (⌈YDPN-638⌋ made by Nippon Steel & Sumikin Chemical, epoxy equivalent 177 g/eq) (870.4 g), and a triphenylphosphine catalyst (0.35 g, 0.0013 mol) were placed, heated, dissolved, and reacted for 7.5 hr with stirring at 180° C. After termination of the reaction, the reaction product was poured and cooled in a metal tray, thus obtaining a phosphorus-containing flame retardant epoxy resin (C-3) (1220.0 g) in a glass phase. The epoxy equivalent of the obtained phosphorus-containing flame retardant epoxy resin (C-3) was 337 g/eq, and the phosphorus content thereof measured in the same manner as in Example 1 was 3.0% (theoretical phosphorus content: 3.1%) as shown in Table 1 below.

<Preparation of Flame Retardant Epoxy Resin Composition>

The phosphorus-containing flame retardant epoxy resin (C-3) (100 parts by mass) was added with an o-cresol novolac epoxy resin (40.7 parts by mass), a bisphenol A-type epoxy resin (26.8 parts by mass), tetrakis(glycidyloxyphenyl) ethane (10.1 parts by mass), dicyandiamide (made by Wako Pure Chemical Industries) (4.5 parts by mass) as a curing agent, 2-methylimidazole (made by Wako Pure Chemical Industries) (0.38 parts by mass) as a curing accelerator, and as fillers, silicon oxide (made by Guangdong Zhongshan Jiali Photoelectric Material) (35.3 parts by mass) and aluminum hydroxide (made by Jinan Jinyingtai Chemical) (44.1 parts by mass), and uniformly mixed at 25° C. for 60 min, giving a resin composition (a flame retardant epoxy resin composition).

Subsequently, the total amount of the resin composition thus obtained was added with methylethylketone (76.1 parts by mass) and N,N-dimethylformamide (68.4 parts by mass) and mixed at 25° C. for 60 min using a mixer, giving a flame retardant epoxy resin composition in varnish form. The phosphorus content of the flame retardant epoxy resin composition in varnish form as measured in the same manner as in Example 1 was 1.7% (theoretical phosphorus content: 1.7%) as shown in Table 2 below.

<Preparation and Evaluation of Printed Circuit Board>

A printed circuit board was manufactured and evaluated in the same manner as in Example 1, with the exception that the flame retardant epoxy resin composition in varnish form as above was used. The results are shown in Table 2 below. The prepreg thus obtained contained 66 mass % of the resin.

Comparative Example 1

Preparation of Phosphorus-Containing Flame Retardant Epoxy Resin

In a 2000 mL four-neck flask, HCA (363.0 g, 1.68 mol), a phenol novolac epoxy resin (⌈YDPN-638⌋ made by Nippon Steel & Sumikin Chemical, epoxy equivalent 177 g/eq) (871.8 g), and a triphenylphosphine catalyst (0.37 g, 0.0014 mol) were placed, heated, dissolved, and reacted for 4 hr with stirring at 180° C. After termination of the reaction, the reaction product was poured and cooled in a metal tray, thus obtaining a phosphorus-containing flame retardant epoxy resin (CR-1) (1201.2 g) in a glass phase. The epoxy equivalent of the obtained phosphorus-containing flame retardant epoxy resin (CR-1) was 390 g/eq, and the phosphorus content thereof measured in the same manner as in Example 1 was 4.1% (theoretical phosphorus content: 4.2%) as shown in Table 1 below.

<Preparation of Flame Retardant Epoxy Resin Composition>

The phosphorus-containing flame retardant epoxy resin (CR-1) (100 parts by mass) was added and uniformly mixed with an o-cresol novolac epoxy resin (40.7 parts by mass), a bisphenol A-type epoxy resin (26.8 parts by mass), tetrakis (glycidyloxyphenyl)ethane (10.1 parts by mass), dicyandiamide (made by Wako Pure Chemical Industries) (5.8 parts by mass) as a curing agent, 2-methylimidazole (made by Wako Pure Chemical Industries) (0.16 parts by mass) as a curing accelerator, and as fillers, silicon oxide (made by Guangdong Zhongshan Jiali Photoelectric Material) (35.3 parts by mass) and aluminum hydroxide (made by Jinan Jinyingtai Chemical) (44.1 parts by mass), giving a resin composition (a flame retardant epoxy resin composition).

Subsequently, the total amount of the resin composition thus obtained was added with methylethylketone (76.1 parts by mass) and N,N-dimethylformamide (68.4 parts by mass) and mixed at 25° C. for 60 min using a mixer, giving a flame retardant epoxy resin composition in varnish form. The phosphorus content of the flame retardant epoxy resin composition in varnish form as measured in the same manner as in Example 1 was 2.5% (theoretical phosphorus content: 2.4%) as shown in Table 2 below.

<Preparation and Evaluation of Printed Circuit Board>

A printed circuit board was manufactured and evaluated in the same manner as in Example 1, with the exception that the flame retardant epoxy resin composition in varnish form as above was used. The results are shown in Table 2 below. The prepreg thus obtained contained 66 mass % of the resin.

TABLE 1

| | Phosphorus content (%) | |
|---|---|---|
| | Measured | Theoretical |
| Phosphorus-containing flame retardant epoxy resin (C-1) | 4.1 | 4.2 |
| Phosphorus-containing flame retardant epoxy resin (C-2) | 3.0 | 3.0 |
| Phosphorus-containing flame retardant epoxy resin (C-3) | 3.0 | 3.1 |
| Phosphorus-containing flame retardant epoxy resin (CR-1) | 4.1 | 4.2 |

TABLE 2

| | | Example 1 | Example 2 | Example 3 | Comparative Example 1 |
|---|---|---|---|---|---|
| Mixing component (parts by mass) of flame retardant epoxy resin composition | Phosphorus-containing flame retardant epoxy resin (C-1) | 100 | — | — | — |
| | Phosphorus-containing flame retardant epoxy resin (C-2) | — | 100 | — | — |
| | Phosphorus-containing flame retardant epoxy resin (C-3) | — | — | 100 | — |
| | Phosphorus-containing flame retardant epoxy resin (CR-1) | — | — | — | 100 |
| | o-Cresol novolac epoxy resin | 40.7 | 40.7 | 40.7 | 40.7 |
| | Bisphenol A-type epoxy resin | 26.8 | 26.8 | 26.8 | 26.8 |
| | Tetrakis(glycidyloxyphenyl)ethane | 10.1 | 10.1 | 10.1 | 10.1 |
| | Dicyandiamide | 5.3 | 4.7 | 4.5 | 5.8 |
| | 2-Methylimidazole | 0.24 | 0.44 | 0.38 | 0.16 |
| | Silicon oxide | 35.3 | 35.3 | 35.3 | 35.3 |
| | Aluminum hydroxide | 44.1 | 44.1 | 44.1 | 44.1 |
| Evaluation results | Phosphorus content  Measured | 2.5 | 1.8 | 1.7 | 2.5 |
| | Theoretical | 2.4 | 1.7 | 1.7 | 2.4 |
| | Tg (° C.) | 144 | 161 | 165 | 157 |

TABLE 2-continued

|  | Example 1 | Example 2 | Example 3 | Comparative Example 1 |
|---|---|---|---|---|
| Heat resistance (min) | >30.0 | 12.3 | 13.4 | 5.1 |
| Water absorption (%) | 0.22 | 0.16 | 0.17 | 0.27 |
| Flame retardancy (UL 94) | V-0 | V-0 | V-0 | V-0 |

As is apparent from the above results, the printed circuit boards of Examples 1 to 3 had high Tg (144° C. or higher), high heat resistance (12.3 min or more), high flame retardancy even in the absence of a halogen-based flame retardant, and low water absorptiveness (water absorption rate: 0.22% or less). The printed circuit boards of Examples 1 to 3 could effectively suppress generation of defects of, for example, a soldering process exposed to high temperature.

In contrast, the printed circuit board of Comparative Example 1 exhibited low heat resistance and high water absorptiveness.

Typically, the phosphorus content of a phosphorus-containing flame retardant epoxy resin, namely, the phosphorus content of a flame retardant epoxy resin composition, has a great influence on flame retardancy of the flame retardant epoxy resin composition. The phosphorus content of the flame retardant epoxy resin composition of Example 1 was adjusted so as to be equal to that of the flame retardant epoxy resin composition of Comparative Example 1, and the printed circuit board of Example 1 satisfied V-0 standard upon UL 94 testing, as in the printed circuit board of Comparative Example 1. However, since Compound (I)-101 has a benzyl group, its molecular weight is about 1.4 times that of HCA. In order to control the phosphorus content of the flame retardant epoxy resin composition using Compound (I)-101 so as to be equal to that of the flame retardant epoxy resin composition using HCA, the amount of Compound (I)-101 has to be used 1.4 times the amount of HCA, thus increasing the preparation cost. On the other hand, the amount of Compound (I)-101 in the flame retardant epoxy resin composition of Example 2 was adjusted so as to be equal to the amount of HCA in the flame retardant epoxy resin composition of Comparative Example 1. Although the phosphorus content thereof was lower than that of the flame retardant epoxy resin composition of Example 1, the printed circuit board of Example 2 satisfied V-0 standard upon UL 94 testing, as in the printed circuit board of Comparative Example 1. In this way, Compound (I)-101 was very effective at imparting flame retardancy. This is considered to be because a radical species produced from the benzyl group (aralkyl group) of Compound (I)-101 upon combustion has combustion inhibitory effects. Likewise, the amount of Compound (I)-201 in the flame retardant epoxy resin composition of Example 3 was adjusted so as to be equal to the amount of HCA in the flame retardant epoxy resin composition of Comparative Example 1, and the printed circuit board of Example 3 satisfied V-0 standard upon UL 94 testing, as in the printed circuit board of Comparative Example 1. Also, Compound (I)-201 was very effective at imparting flame retardancy, like Compound (I)-101. This is considered to be because a residual product derived from the phenyl group (aryl group) of Compound (I)-201 upon combustion blocks oxygen necessary for combustion and thus exhibits combustion inhibitory effects.

Although Tg was high in any printed circuit board, the Tg of the printed circuit board of Example 1 was slightly lower than that of printed circuit boards of Example 2 and Comparative Example 1. This is considered to be because Compound (I)-101 has a large molecule volume compared to HCA, when Compound (I)-101 and some of epoxy groups of the phenol novolac epoxy resin are reacted and the unreacted epoxy group is reacted with the curing agent (curing reaction), it is difficult to carry out the curing reaction using the unreacted epoxy group due to steric hindrance of the portion derived from Compound (I)-101. In Example 2 using Compound (I)-101 in an amount smaller than that of Example 1, Tg was higher than in Example 1. This is considered to be because steric hindrance as above is alleviated in Example 2 and thus curing reaction is easily carried out by the unreacted epoxy group.

The flame retardant epoxy resin composition according to the present invention manifests high flame retardancy even at low phosphorus content, and thus is superior in terms of not only low water absorptiveness, high heat resistance and flame retardancy but also profitability, compared to conventional flame retardant epoxy resin compositions.

As described hereinbefore, the present invention is applicable to fabrication of parts of electric and electronic equipment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A phosphorus-containing flame retardant epoxy resin, obtained by reacting an epoxy resin having at least three epoxy groups per molecule with an organophosphorus compound represented by Formula (I) below:

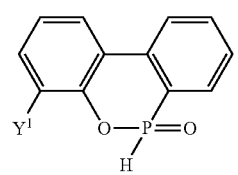

Formula (I)

wherein $Y^1$ is an aralkyl group or an aryl group.

2. The phosphorus-containing flame retardant epoxy resin of claim 1, wherein the organophosphorus compound represented by Formula (I) is an organophosphorus compound represented by Formula (I)-101 or (I)-201 below:

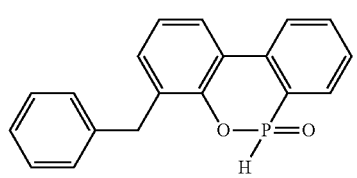

Formula (I)-101

-continued
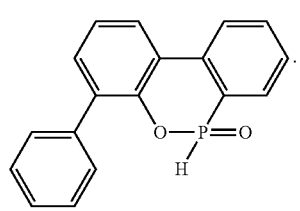
Formula (I)-201
3. The phosphorus-containing flame retardant epoxy resin of claim 1, which is obtained by mixing and reacting 100 parts by mass of the epoxy resin with 1~100 parts by mass of the organophosphorus compound represented by Formula (I).
* * * * *